United States Patent [19]

Terenzi

[11] Patent Number: 5,735,231
[45] Date of Patent: Apr. 7, 1998

[54] AUTOMATIC DOG AND CAT FEEDER

[76] Inventor: Bruno Terenzi, 1341 Claremont Dr., San Bruno, Calif. 94066

[21] Appl. No.: 699,550

[22] Filed: Aug. 19, 1996

[51] Int. Cl.[6] .................................................. A01K 5/02
[52] U.S. Cl. ................................................. 119/51.11
[58] Field of Search ............................ 119/51.11, 56.1, 119/51.5, 53

[56] References Cited

U.S. PATENT DOCUMENTS

| | | | |
|---|---|---|---|
| 741,262 | 10/1903 | Leighton | 119/56.1 |
| 963,866 | 7/1910 | Caspari | 119/56.1 X |
| 3,295,500 | 1/1967 | Blough | 119/51.5 |
| 3,587,530 | 6/1971 | Blair | 119/51.11 |
| 3,678,902 | 7/1972 | Ruth | 119/51.11 |
| 3,920,224 | 11/1975 | Faussauer | 119/51.11 |
| 4,069,793 | 1/1978 | Gower | 119/51.13 |
| 4,437,595 | 3/1984 | Stevens | 119/51.11 |
| 4,733,634 | 3/1988 | Hooser | 119/51.12 |
| 4,735,171 | 4/1988 | Essex | 119/51.12 |
| 5,372,093 | 12/1994 | Pooshs | 119/51.11 |

*Primary Examiner*—Robert P. Swiatek
*Assistant Examiner*—Yvonne Abbott

[57] ABSTRACT

An elongated vertically extended housing enclosing a hopper. Its lower end funnel connects to fittings extending to the exterior of housing into a feed dish. The pipe holds the dish in place. Dry feed material is controlled electrically by a solenoid operated valve incorporated into the lower fitting to hopper. Two timers control when and how much feed should be released. The first timer activates time of day, the second timer dispenses a feed portion. The second timer being adjustable in seconds per minute. The feed valve solenoid remains open releasing the feed material. The automatic dog and cat feeder can be used indoors and outdoors. Its exterior cabinet as well as the frame is sheet metal. The feeder as well as other feeders are to a degree fairly waterproof, but for outdoor use an inexpensive plastic cover as an accessory provides inclement weather protection.

7 Claims, 4 Drawing Sheets

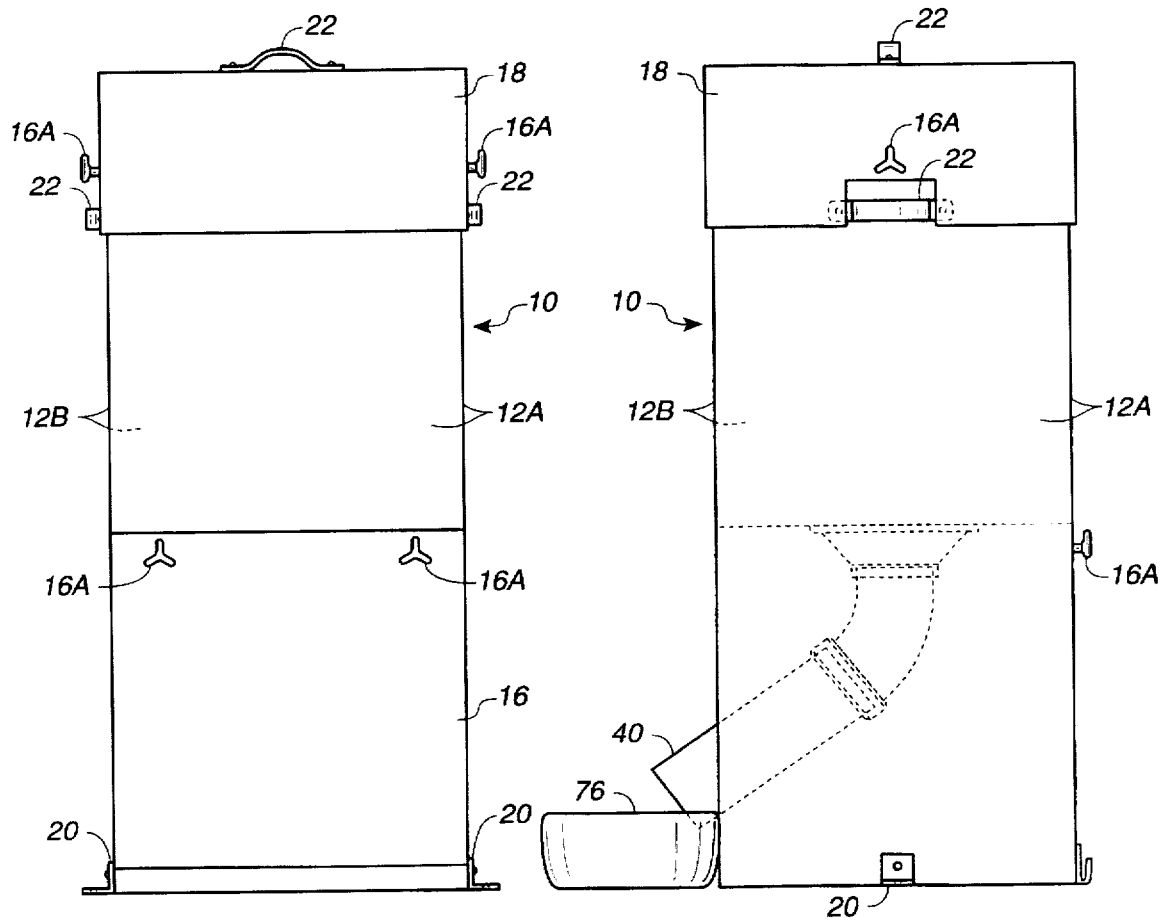
FIG._1  FIG._6

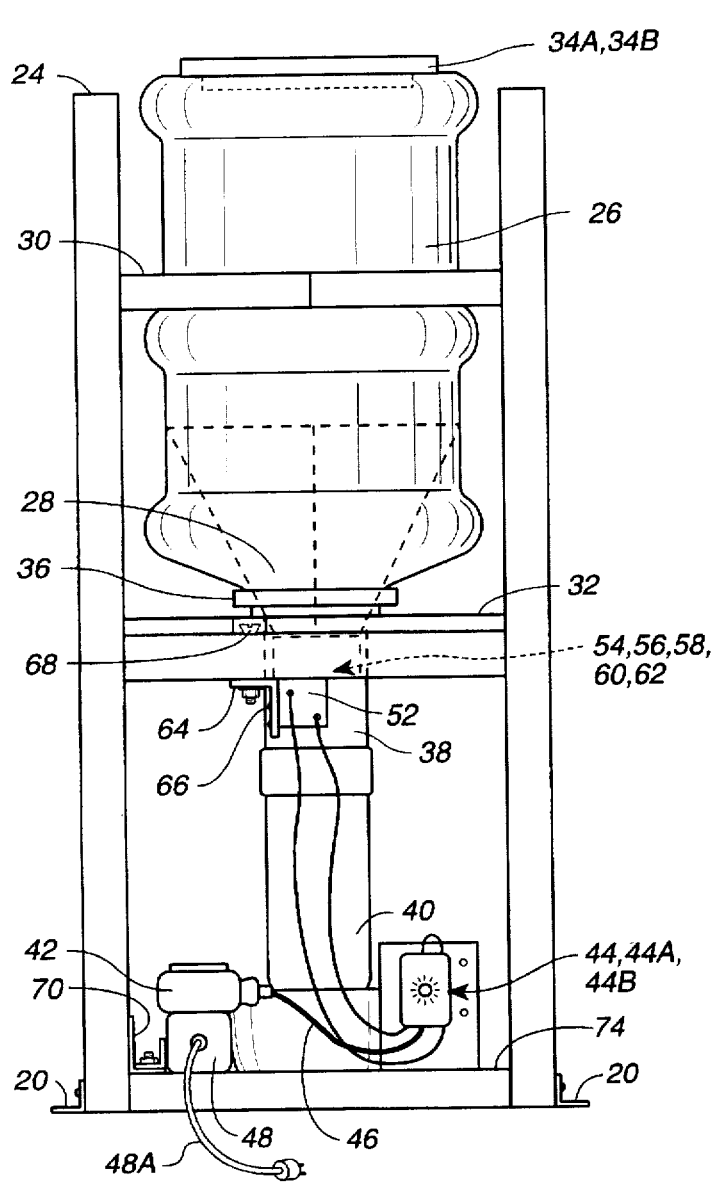
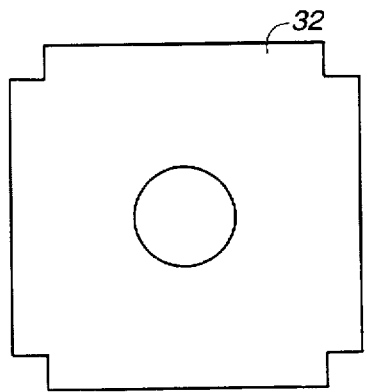
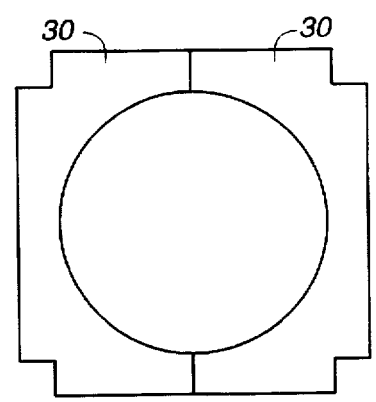
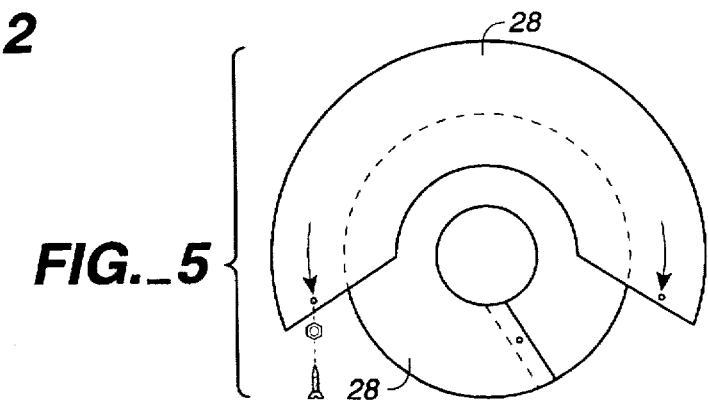

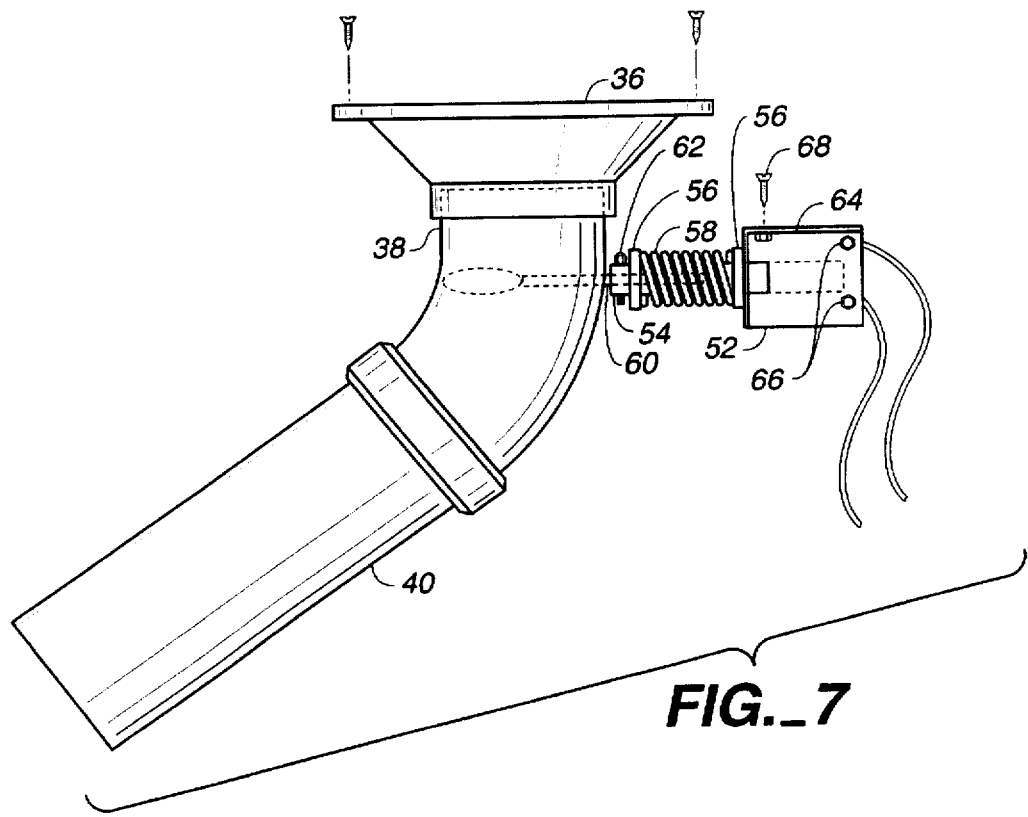
FIG._7
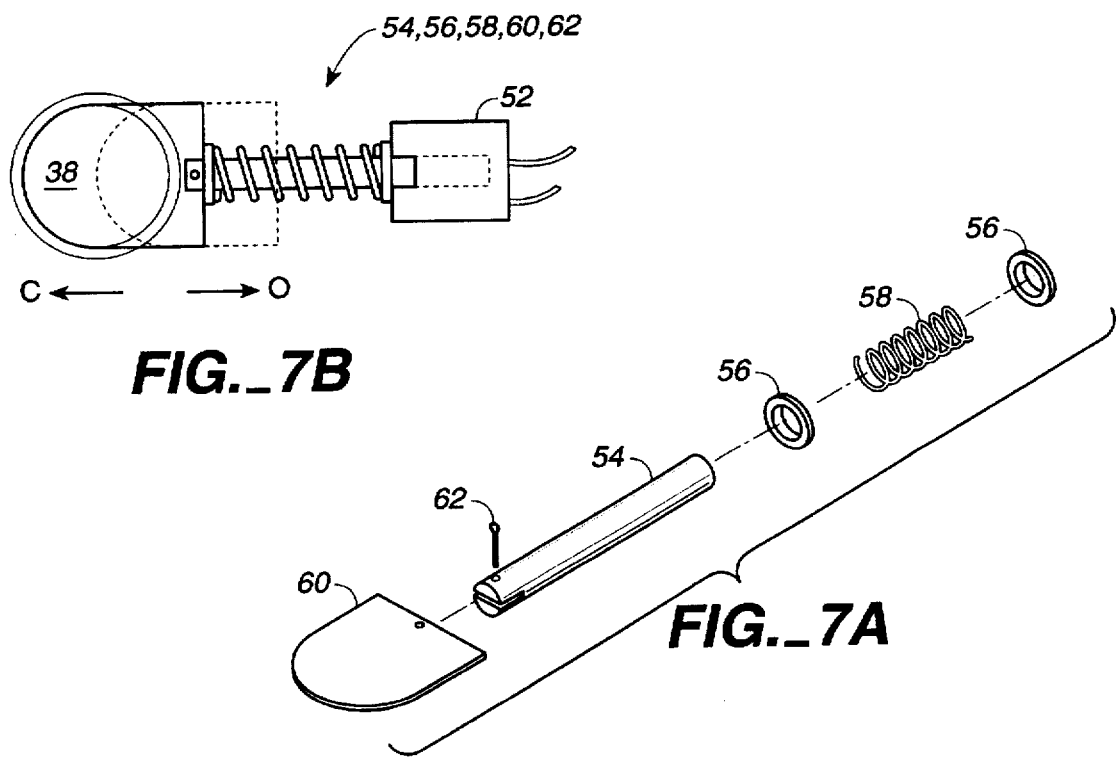
FIG._7B
FIG._7A

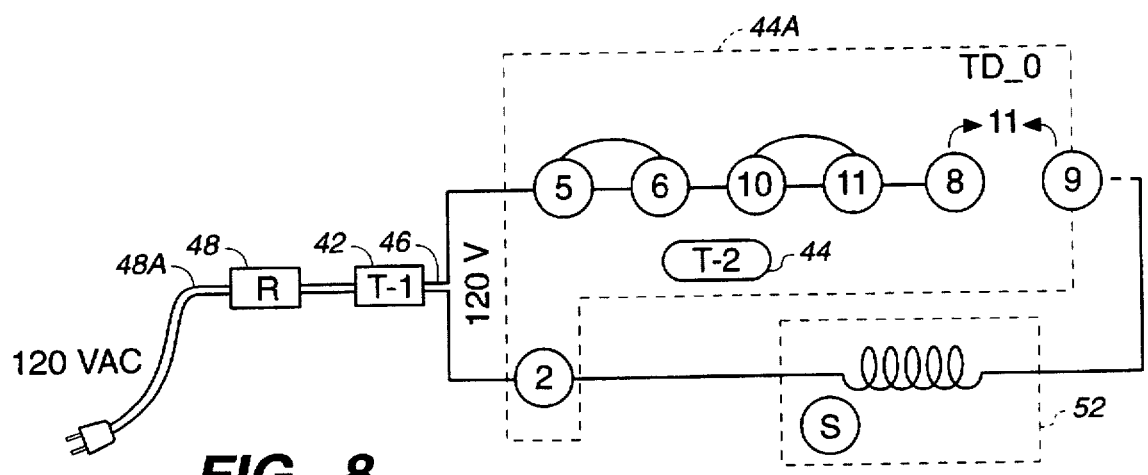
FIG._8
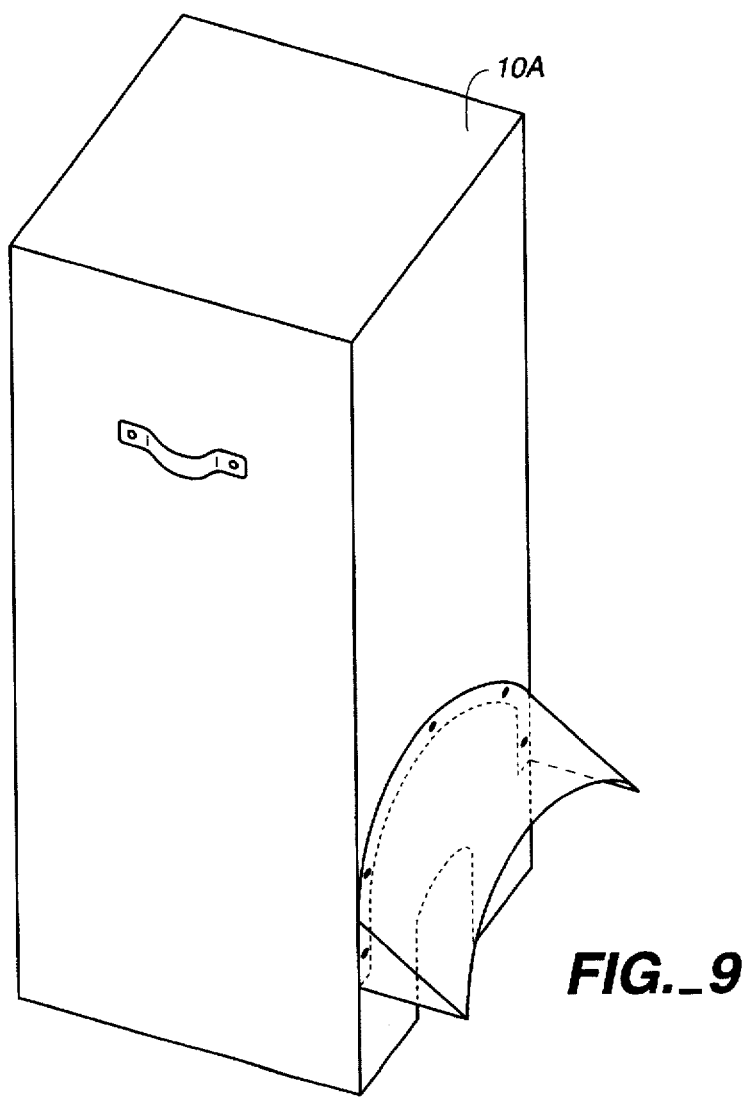
FIG._9

AUTOMATIC DOG AND CAT FEEDER

BACKGROUND—FIELD OF INVENTION

This invention relates to an automatic dog and cat feeder that improves the delivery of dry particular matter feed desired at predetermined time intervals.

BACKGROUND—DESCRIPTION OF PRIOR ART

Many of the prior art category of animal feeders were primarily made to provide feeders for dogs and cats. They were designed to feed pets when owners were away from home. Their design was to automatically accomplish this task reliably and not bother neighbors, friends, or family to do this task daily. These pet feeders have many designs and various ways of approaching this objective. Besides being very expensive and complicated mechanically such as motors, pulleys, augers, gears and so many features, few have been marketable. Notably, only a few plastic and one metal battery operated which spread the food in a radius are available or you can order from a pet store. These are not suitable or strong enough to withstand the abuse from dogs, raccoons, skunks, etc. or being toppled over; only one plastic model with 5-meal rotary dish for 120 volt AC, the rest all battery operated.

SUMMARY OF THE INVENTION

The dog and cat feeder includes an elongated vertical housing enclosing a hopper in the upper portion thereof. The lower end is the funnel end connected to fittings. The dry feed material from the hopper is gravity-fed into a feed dish outside the housing. Tipping the housing and installing feed dish under outlet pipe will prevent dish from being moved after cabinet is returned to floor. The means to deliver the feed described above is by a slide valve installed into a fitting that is modified. The valve movement is solenoid operated with timers. One timer selects the time of day for feeding and the other timer the amount of feed delivered. This is regulated by a predetermined setting; the valve remains open for large or small pets' needs.

BRIEF DESCRIPTION OF THE DRAWINGS

A more complete understanding of the feeder may be had by reference to the following detailed described drawings in which:

FIG. 1 is a perspective view of the feeder;

FIG. 2 is a view of all the parts inside the feeder;

FIG. 3 is a view of the base support for the hopper and fitting;

FIG. 4 is a view of the hopper vertical side spacer supports;

FIG. 5 is a view of the template which is formed in the hopper for its lower funnel;

FIG. 6 is a view of the cabinet and pipe fittings to the exterior feed dish;

FIG. 7 is a view of the fittings, modification and slide valve assembly parts;

FIG. 7A is a view of the slide valve assembly parts;

FIG. 7B is a view of the opening from above showing the closed and open operational position of slide valve and solenoid;

FIG. 8 is a schematic of the electrical circuit of invention; and

FIG. 9 is a view of the protective cover for outdoor use of the feeder.

DESCRIPTION OF THE PREFERRED EMBODIMENT

The automatic dog and cat feeder as best seen in FIG. 1, includes an elongated vertical square housing of sheet metal material of light-weight metal.

FIG. 2 comprises all of the components inside the housing. The frame item 24 of feeder item 10 is a one-piece square metal tubing welded together of the various pieces. The height is capable of enclosing all the components required.

FIG. 3 item 32 a piece of plywood is the base support for a hopper item 26 and item 36 a closet and hub fitting. The hopper item 26 is a 5-gallon plastic water bottle that has to be modified. A hole is cut in the bottle base for filling the hopper with feed. The cover item 34A and 34B for the hole is made from plywood pieces; one the hole diameter and the other a little larger diameter bolted together with a hole in the center of each piece provides a cover for the hopper hole. Item 26 plastic bottle neck is cut off square across leaving a 3" hole. The hopper is then installed into the frame to item 36 a closet flange and hub which mounts in hole of base item 32 and accommodate each other.

A funnel FIG. 5 item 28 is manufactured from a template using the formula to get the correct slope for dry feed to dispense from the hopper. It was made from surplus copper clad mica material flexible with a hole punched in each end. The funnel was then installed through the feed hole and formed inside the hopper; a small bolt and nut keep the two ends together.

Item 38 a spigot and hub with a slot cut into it is installed into item 36 a closet and hub. The following procedure is required to modify the spigot and hub with the correct slot cut.

Referring to FIG. 7, you will notice the side opposite the bend is where the slot is to be cut. First mount the bracket item 64 to the frame item 24 in the center of control panel frame support of the hopper base item 32 as depicted in FIG. 2. This is determined with the solenoid mounted to the bracket and the shaft item 54 inserted in the solenoid armature core hole. Extending the shaft to the maximum will provide the best position for the slot to be cut in the hub. FIG. 7 and FIG. 7B show the horizontal cut parallel to hub and in line to solenoid core hole is necessary, making sure the hub item 38 is fully pressed into item 36 a closet and hub and item 40 a pipe is installed into item 38. It should exit opposite side of solenoid centered between the frame item 24 vertical supports. Then mark and remove the hub.

Item 60 a slide valve was made from a piece of flat aluminum material. After the hub is modified with the slot, reinstall it back into item 36 fully with item 40 pipe inserted and centered between frame members. When feeder is completed, item 40 pipe will exit sheet metal side item 12B of FIG. 1 into the feed dish item 76. Tipping item 10 will allow the feed dish to be installed and held in place by item 40 pipe. The feed dish will have some holes in bottom to allow for any water drainage.

Item 18 (FIG. 6) is a sheet metal cover that fits over top of feeder item 10. Item 20 angle iron brackets are bolted to frame left and right side as shown in FIG. 1. They can be used to anchor feeder to concrete with studs or using 9" metal stakes, garden or tent type, into ground.

Because of space limitation and simplicity, it is easier to install the parts items 54 to 62 assembled together as shown in FIG. 7 and 7B. Holding the assembled parts and compressing spring with your fingers insert assembled parts into 52 solenoid core hole. Then install slide valve 60 into item 38 and mount assembly to bracket item 64 with bolts item 66. With everything secured, pulling the slide back by hand should work smoothly and return with spring pressure to the closed position. Minor adjustment could provide trouble free operation if needed. It is noted here that all ABS fittings are pressed together and not cemented together. There isn't any liquid to leak out and the fittings function are to provide a conduit to gravity feed dry particulate material feed. Also, it takes considerable effort to install or remove apart after pressed together.

The electrical controls are next installed on item 74 base. Item 48 receptacle with a single 3-prong socket, ground pin facing front, is installed on left side of cabinet to item 70 bracket. Item 42 Timer-1 is plugged into socket of item 48 and the timer's socket will be on the right side for accessibility. The adjustment dial will also face front. Next item 44B bracket is mounted to item 74 base support. Item 44A socket 11 pin mounts to item 44B bracket. Item 46 plug and wires are connected to item 44A socket terminals as depicted in FIG. 8 with the plug into T-1 socket and wires of 52 solenoid to 44A terminals.

Item 44 T-2 timer plugs into item 44A after completion of wiring. Item 44 T-2 timer is a solid state timer model T2K-30-461 range, 0.3–30 seconds. Mfg. NCC (National Control) 11 pin. It has an adjustable dial knob. Item 48A 120 volt power cord and plug connects to item 48 receptacle through item 12B sheet metal left side of control panel cabinet. Item 42 T-1 timer is an Intermatic Time All Model SB711C. It has two (2) on/off settings a day. This timer was selected because it could be set for ¼ hour minimum, the lowest setting which power would be on to its outlet socket because the requirements for feeding a dog or cat is controlled in seconds. The T-2 timer is set for only 1 to 2 seconds, for example, for 4 ounces of feed for a cat.

The T-2 timer makes only one cycle and will reset after T-1 timer trips the power off to its socket outlet. The cycle will repeat one or two times a day as required. As mentioned for animal feeding, it is recommended daylight settings be used to prevent raccoons or other animals that forage at night from eating pet's feed. Functional testing of about 50 cycles should be done before feed is put in the hopper. This is accomplished by turning T-1 timer clockwise until an audible click is heard, then set T-2 timer, for example, 5 seconds. Then plug item 48A into power. The solenoid item 52 will energize opening slide valve for 5 seconds then return to closed position. Doing this for 5 to 10 minutes plugging and unplugging to power will provide enough functional testing. Then putting feed in the hopper and trying different settings of T-2 timer will give the correct amount of feed desired. Then adjusting T-1 timer to the correct time will put the feeder in automatic operation.

Another problem relates to various feeding devices that combine the delivery of feed and water. There are many disadvantages to feeders with this feature. Several are listed here and will be made apparent. First of all, it is not a problem for pet owners to supply pets with water:—buckets of water, watering devices to spigot's drip type methods, pet store devices, float devices, etc. Feeders with water and feed are electrically controlled and can make them inoperable. The problem of mold, algae, humidity in an enclosed cabinet could affect dry particulate feed material getting soggy and not dispensing properly. The condition of the cabinet would be a health problem for pets and difficult to clean or control. Pet owners already know what a problem it is to keep dish and water containers clean. Humidity also would affect electrical controls and cause rust. Basically, it would be better and simpler without getting into the mechanics of it.

Consideration must be taken to provide protection to feeder in inclement weather. A vinyl cover or plastic square container which is locally purchased would provide this protection. The container as down in FIG. 9 item 10A with a slot cut out would fit over feeder FIG. 6 item 10 to the ground over pipe to feed dish. As depicted in FIG. 9 a plastic hood riveted to container would provide some umbrella protection also over feed dish. This invention is constructed as well as other feeders but the problem has not been addressed in prior art reviewed. For example, covers are made for barbecues and many outdoor items. Any animal feeder should be protected from inclement weather. For very little cost it would provide complete protection from inclement weather.

I have described and made some references that may or may not be apparent. The feed conduit fittings for example are 3" inside diameter. This allows feed to freely dispense without the problem of feed bridging, a common occurrence in feed devices. Also, item 60 shown in FIG. 7A a slide valve is wide enough and when installed is supported on each side of slot item 38. This guides and prevents slide from rotating because core 54 is round and free floating in core hole of solenoid item 52. Also in FIG. 7B in the open position you will notice the valve item 60 of FIG. 7A does not open fully. It does open enough because its oval curviture provides a large area for feed to fall through. The rating of solenoids have pull in ounces and pounds versus length of stroke. The solenoid item 52 in FIG. 7B has a maximum 1¼" length of stroke and combined with 3" fittings provides very good feed delivery.

SUMMARY, RAMIFICATIONS AND SCOPE

Thus, the reader will see that the Automatic Dog and Cat Feeder is simple, easy to operate and reliable. It has the least mechanical parts to function as stated. Further improvement would be possible with the manufacture of similar parts but also to facilitate assembly. A molded square hopper with a funnel end, threaded end, and the other fittings all threaded male and female, the hopper being square would hold more feed and with a feed hole cover, the fitting with the slot could be made during production. The frame made of angle iron, square to support hopper, with legs, sheet metal sides, electrical controls are all easily assembled with bolts and sheet metal screws. Some of the parts in the first embodiment could be eliminated. In a kit form it would not be difficult to assemble with some parts off the shelf items used in the present invention. The cover as seen in FIG. 9 item 10A could be made an accessory for outside use of feeder for protection in inclement weather.

This invention has been described with references to its illustrated preferred embodiment. Persons skilled in the art of constructing feeding apparatus may upon exposure to the teaching herein conceive variations in the mechanical development of the components therein. Such variations ere deemed to be encompassed by the disclosure, the invention being delimited only by the appended claims.

Drawing Reference Numerals Worksheet

10 Feeder
10A outdoor cover
12A sheet metal right side
12B left side
16 sheet metal door front 16A knobs 4 ea. 3 prong
18 feeder top cover, sheet metal
20 angle iron brackets 2 ea.
22 handles sides and top cover
24 frame welded sq. stock steel
26 hopper
28 internal funnel (in hopper)
30 hopper support spacers, plywood 2 ea.
32 hopper base, plywood (with hole in center)
34A A hopper feed hole cover
34B hopper feed hole cover plywood
36 3" closet and hub
38 3"⅛" bend spigot and hub (with slot cut in it)
40 3"×12" ABS feed pipe to feed dish
42 Timer 1 intermatic Time All MD.SB711C
44 Timer 2
44A timer socket 11 pin
44B timer mount bracket
46 elec. plug and wiring for Timer 2 (to T-1 and 44A terminals)
48 120 volt recepticle
48A power cord and plug with connector to 12B
52 solenoid part no. 281-001-001 Argdon Corp., Forest Park, Ill.
54 solenoid shaft (core or plunger) with yoke end
56 washers 2 ea.
58 compression spring
60 slide valve (with hole for cotter pin)
62 cotter pin Drawing Reference Numerals Worksheet 64 solenoid mount bracket (to frame)
66 solenoid mount bolts 2 ea.
68 solenoid bracket bolt to frame
70 Timer 1 support bracket
74 base support for elec. controls
76 feed dish

I claim:

1. An automatic dog and cat feeder comprising:

a. a housing consisting of access holes;

b. a frame;

c. a hopper with top inlet hole for receiving feed and outlet hole on lower portion;

d. a funnel template installed in said hopper and formed in lower portion therein;

e. a cover for the hopper inlet hole;

f. a support base with a center hole on said frame;

g. a closet and hub installed on said base into its hole and the hopper accommodated above it;

h. a bend spigot and hub with a slot;

i. a pipe inserted into said bend spigot and hub with slot and said pipe exiting a hole in said housing to the exterior;

j. a valve positioned in said bend spigot and hub slot hole capable of reciprocating;

k. a feed dish positioned to receive feed from the pipe; and l. an automatic control means for operating said valve at predetermined time periods to thereby control amount of feed discharged to exterior feed dish.

2. An automatic dog and cat feeder as set forth in claim 1 further including a solenoid comprising shaft compression spring washers cotter pin connected to said valve having ability to reciprocate.

3. An automatic dog and cat feeder as set forth in claim 1 wherein said automatic control means comprises a time clock mechanism to cause said clocks presettable contacts trip to operate at different times said valve operates with another time control device its period of operation time intervals.

4. An automatic dog and cat feeder as set forth in claim 1 further including a support for the hopper upper portion surrounding its round structure fastened to the housing sides.

5. An automatic dog and cat feeder as set forth in claim 1 further including a cover for the housing top portion and a door panel lower said housing opening to controls therein.

6. An automatic dog and cat feeder as set forth in claim 1 further including a angle iron fastened to the frame at floor level with holes provided in said angle iron to also anchor to a concrete floor or with garden or tent stakes into ground.

7. An automatic dog and cat feeder as set forth in claim 1 further including a cover for protection from the weather if said feeder is used outdoors.

* * * * *